United States Patent [19]

Baversten

[11] Patent Number: 5,133,466

[45] Date of Patent: Jul. 28, 1992

[54] WET LIFT RIG

[75] Inventor: Bengt I. Baversten, Simsbury, Conn.

[73] Assignee: Combustion Engineering, Inc., Windsor, Conn.

[21] Appl. No.: 805,171

[22] Filed: Dec. 11, 1991

[51] Int. Cl.5 .............................................. B66C 11/12
[52] U.S. Cl. ................................................... 212/221
[58] Field of Search ............... 212/166, 205, 220, 221, 212/271; 294/82.1

[56] References Cited

U.S. PATENT DOCUMENTS 1,605,281  11/1926  Reece .................................. 212/221
3,738,521  6/1973   Long, III ............................ 212/221
4,496,063  1/1985   Ishii et al. ......................... 212/221

Primary Examiner—Jesus D. Sotelo
Assistant Examiner—Stephen P. Avila
Attorney, Agent, or Firm—John H. Mulholland

[57] ABSTRACT

A watertight cover for the hook of a crane comprises a cylindrical rod interposed between the hook and the load. A circular seal, slidingly carried on the rod, engages an imperforate cover member telescoped over the rod and the hook. A device is provided for drawing the seal and cover member toward the hook as the hook is lowered into the water.

2 Claims, 2 Drawing Sheets

WET LIFT RIG

BACKGROUND AND SUMMARY OF THE INVENTION

The present invention pertains to cranes and, more particularly, to cranes used in the manipulation of equipment submerged in the water of a boiling water nuclear reactor (BWR).

Movement of equipment and components of a boiling water reactor is accomplished by the use of a heavy-duty overhead crane which comprises a part of the reactor system. Due to the limited space available within the pressure vessel and the geometry of the pool within which the loads are located, it may sometimes be necessary to lower the crane hook below the water surface. Because the water is radioactive, it is undesirable to wet the crane hook, hook block or cables therein, as they must then be thoroughly washed or otherwise decontaminated before they may be used again.

It is, therefore, a primary object of the present invention to provide a watertight cover for a crane hook, hook block, and cables which does not interfere with the crane operation.

The foregoing and other objects and advantages are achieved by a hook cover comprising a cylindrical rod interposed between the hook and the load. A circular seal, sliding carried on the rod, engages an imperforate cover member telescoped over the rod and the hook. Means are provided for drawing the seal and cover member toward the hook as the hook is lowered into the water.

DESCRIPTION OF THE PREFERRED EMBODIMENT

Figure 1:
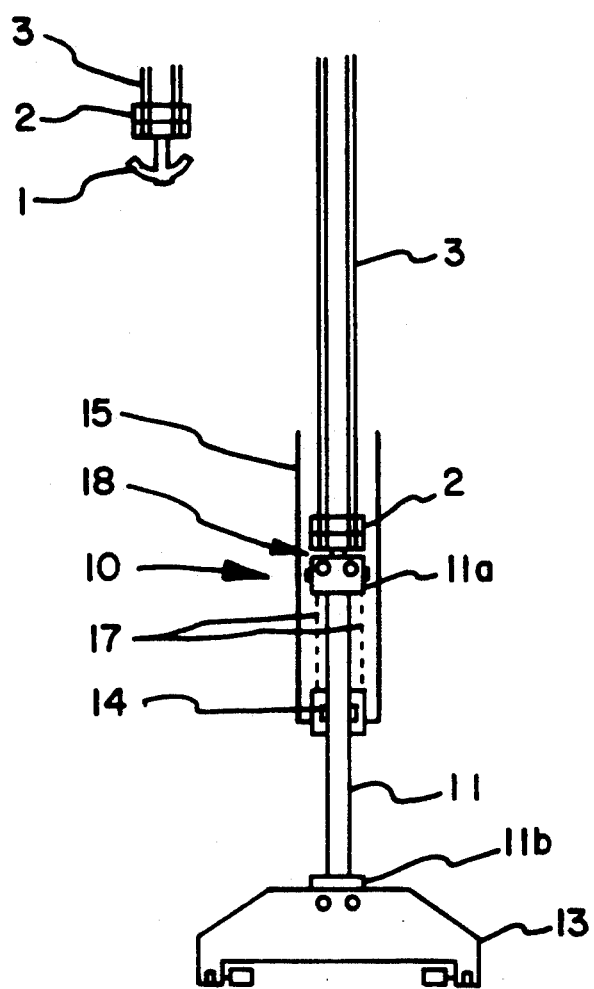
FIG. 1 is a cross-sectional view of a crane hook having a waterproof cover in accord with the present invention.

Turning now to FIG. 1, there is shown a conventional crane hook 1, hook block 2 and cables 3 of the type commonly associated with the overhead traveling crane (not shown) of a boiling water reactor. Also shown, is a waterproof cover 10 installed on a hook 1.

Waterproof cover 10 comprises a cylindrical rod member 11 having a first end fitting 11a adapted to engage the crane hook 1, and a second end fitting 11b adapted to engage a load. For purposes of illustration, a conventional "strongback" 13 is shown attached to hook 1. A circular seal 14, slidingly carried on rod member 11, is moveable between first and second end fittings 11a, 11b. Telescoped over rod member 11 and attached to seal 14, in waterproof fashion, is an imperforate cover member 15 which is of a size to permit telescoping over hook 1.

Due to their weight, seal 14 and cover member 15 tend to move downwardly along rod member 11 and rest against second end fitting 11b. As hook 1 is lowered below the surface of the water, seal 14 and cover member 15 tend to float, thereby moving toward first end fitting 11a. In order to facilitate this relative upward movement, remotely operated means may be provided for drawing seal 14 toward first end fitting 11a. When seal 14 abuts first end fitting 11a, it is advantageous that it be compressed thereagainst to improve the seal reliability. There is shown, for purposes of illustration, a pair of chains 17 connected to seal 14 and wound on power driven spools 18 disposed within first end fitting 11a. It is to be understood that various other pneumatic, hydraulic and mechanical systems may be utilized for this purpose.

Figure 2:
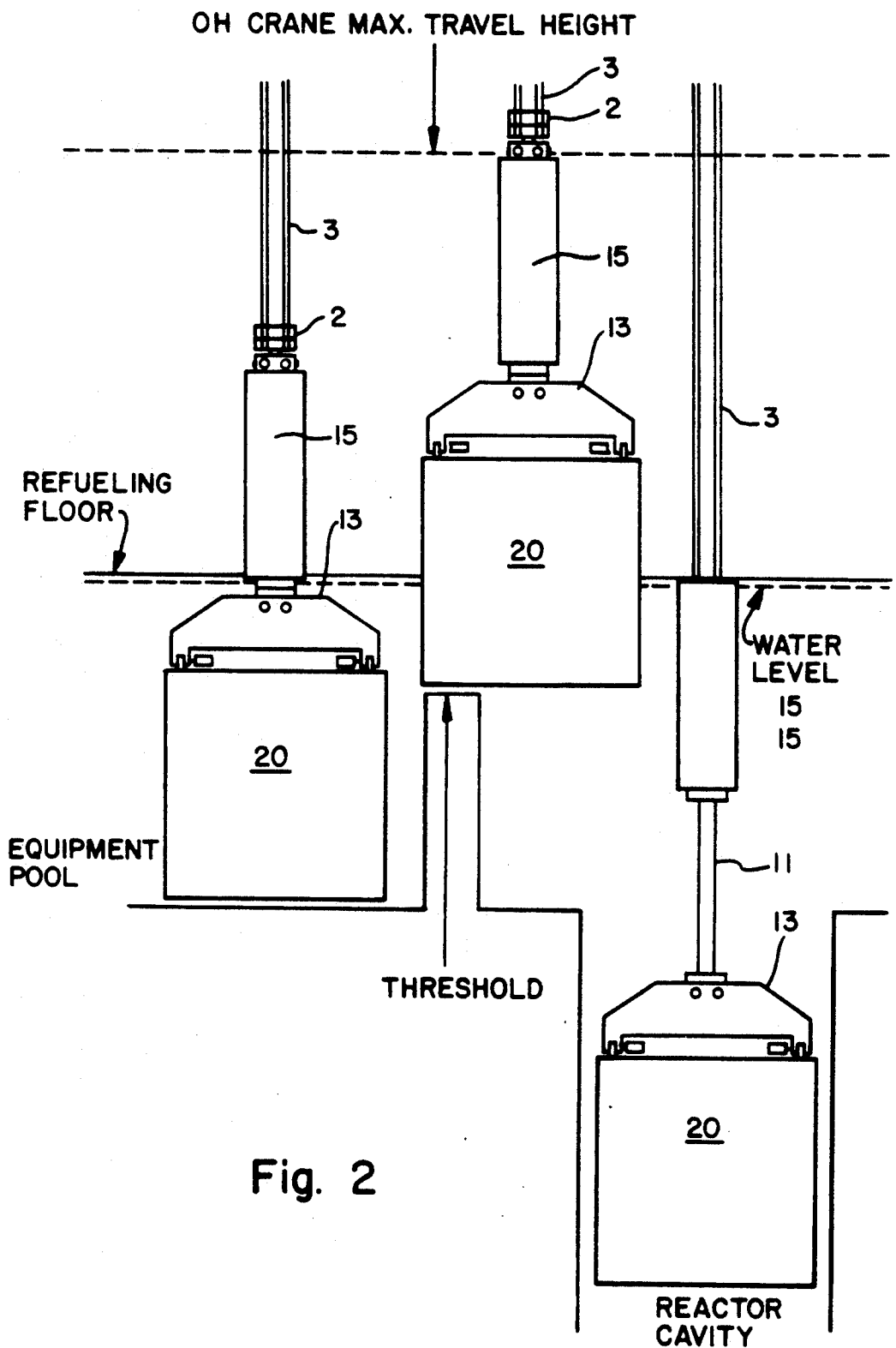
FIG. 2 is a perspective view showing the crane hook and cover of FIG. 1 in use.

In FIG. 2, watertight hook box 10 is shown in use within the pressure vessel of a boiling, water reactor. In particular, a steam separator 20 is being moved from the reactor cavity, over the threshold, to the equipment pool. It will be appreciated that this problem is complicated by the comparatively low maximum travel height of the overhead crane and the desire to avoid wetting crane hook 1, hook block 2, and cables 3.

With steam separator 20 resting in the reactor cavity (see right hand portion of figure), hook 1 is below the pressure vessel water level. Seal 14 and cover member 15 have risen to the upper end of rod member 11 and abut first end fitting 11a. As the load is raised above the threshold (see center portion of figure), seal 14 and cover member 15 drop down rod member 11 to rest against second end fitting 11b. This compaction of the watertight box 10 allows the lifting of separator 20 despite the limited travel height of the crane. After passing the threshold, separator 20 is lowered into the equipment pool. Throughout this operation, hook 1, hook block 2 and cables 3 have been kept from contact with the water.

Although the invention has been described by reference to a preferred embodiment, it is to be understood that various changes and modifications may be effected without departing from the spirit of the invention which is intended to be limited in scope and contemplation only by the appended claims.

I claim:

1. A watertight cover for the hook of a crane comprising:
    a cylindrical rod member having a first end fitting adapted to engage the crane hook and a second end fitting adapted to engage a load;
    a circular seal slidingly carried on said cylindrical rod member and movable between said first and second end fittings; and
    an imperforate cover member telescoped over said cylindrical rod member and engaging said circular seal, said cover member being telescopable over said crane hook.

2. The watertight hook cover of claim 1, further comprising means for drawing said circular seal toward said first end fitting.

* * * * *